UNITED STATES PATENT OFFICE.

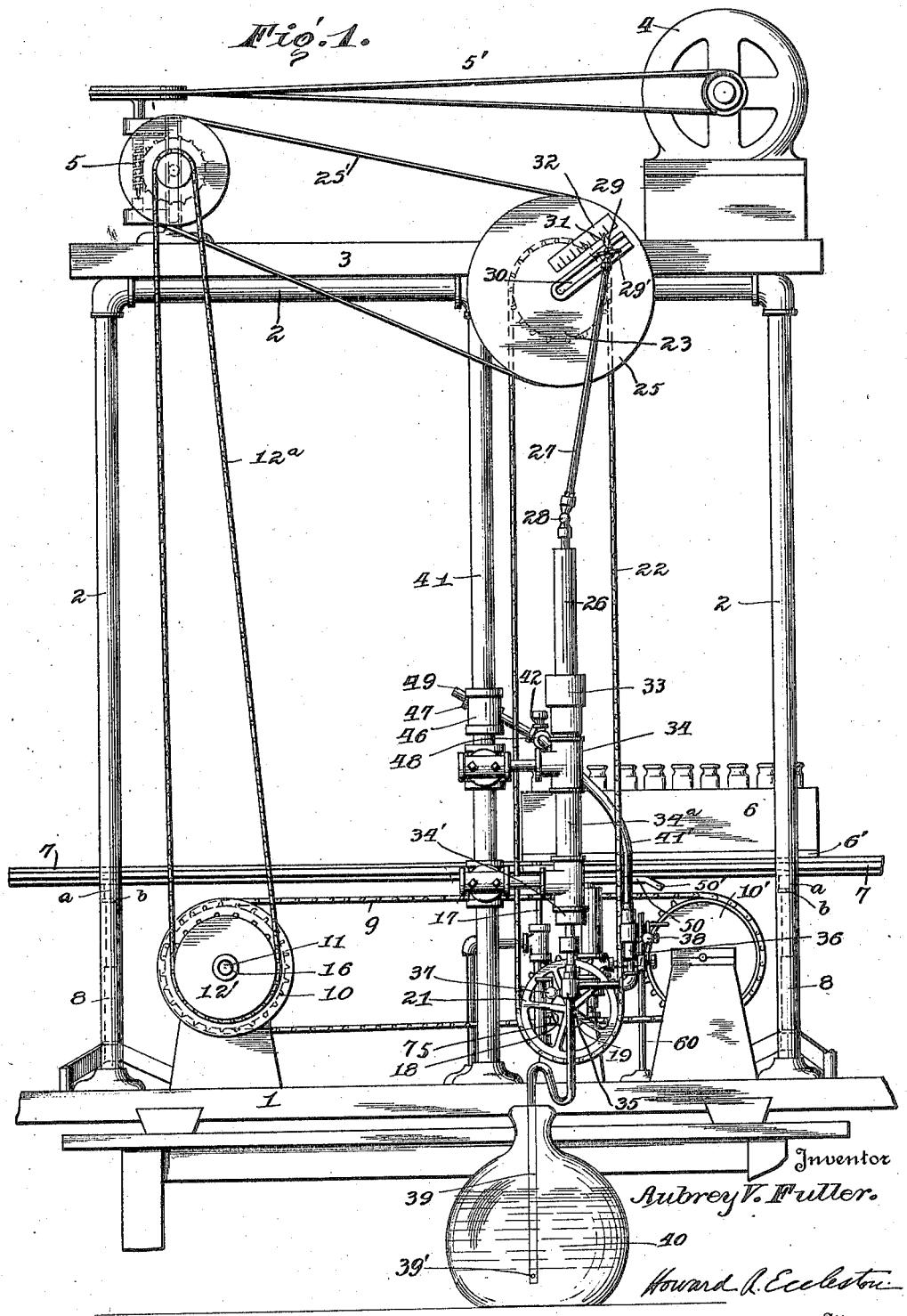

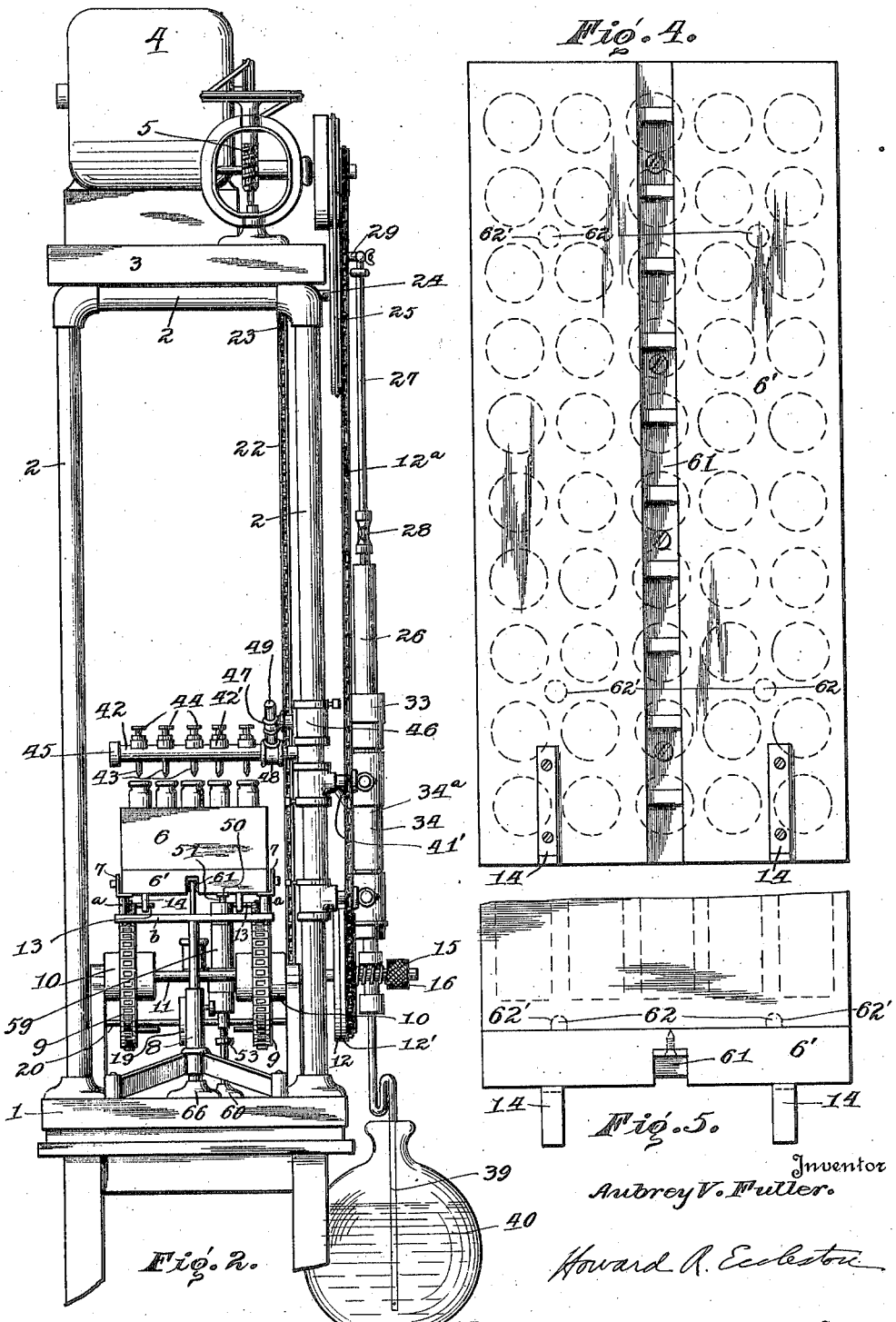

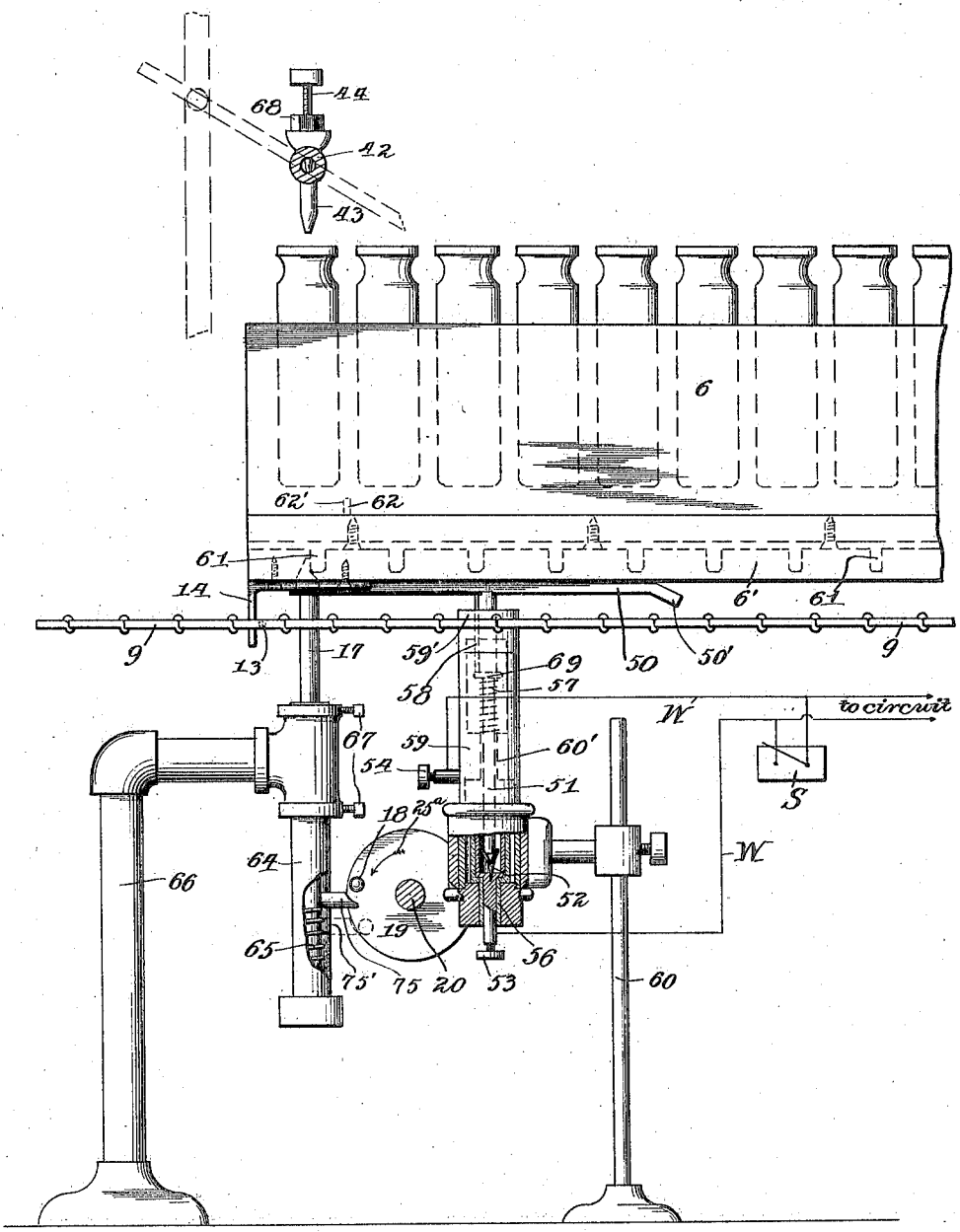

AUBREY V. FULLER, OF NEW YORK, N. Y.

FILLING-MACHINE.

1,393,276.  Specification of Letters Patent.  Patented Oct. 11, 1921.

Application filed March 16, 1920. Serial No. 366,245.

*To all whom it may concern:*

Be it known that I, AUBREY V. FULLER, a citizen of the United States, and a resident of the city of New York, county and State of New York, have invented certain new and useful Improvements in Filling-Machines, of which the following is a specification.

My invention relates to filling machines, and an object thereof is to provide means for cheaply and expeditiously placing in bottles or other receptacles, measured quantities of liquids.

Another object of the invention is to provide a machine of this character which will measure with extreme accuracy the amount of liquid placed in the receptacles, the measurement being independent of the receptacles themselves.

This accuracy of measurement, together with the fact that the machine operates under aseptic conditions, renders it peculiarly adapted to use in the packaging of biological, pharmaceutical, medicinal, and like liquids; although it will be understood, of course, that my invention is not limited thereto.

The invention consists of novel features and parts, and combinations of the same, as hereinafter described and claimed.

Reference is to be had to the accompanying drawings, forming part of this specification, in which similar reference numerals refer to corresponding parts in all the figures.

In the drawings:

Figure 1 is a side elevation of the machine embodying the invention.

Fig. 2 is an end elevation of the same as viewed from the left of Fig. 1.

Fig. 3 is a detail view more clearly showing the starting and stopping device, and also the mechanism for arresting the motion of the tray.

Fig. 4 is a bottom view of the tray, and

Fig. 5 is an end view thereof.

Referring to the drawings in detail, the invention consists of a base 1, a frame 2, on which frame is superposed a top 3, upon which is mounted an electric motor 4, that furnishes power for the operation of the entire machine.

The motor operates a conventional reduction gear 5 by means of a belt 5', which gear 5 drives the friction disk 12', of the friction clutch, and also wheel 25, by means of sprocket 12ᵃ and belt 25' respectively.

When friction disk 12' turns, it causes friction disk 12 to revolve by virtue of the friction produced by the tension of the helical spring 15, this tension being adjustable for various loads by a knurled nut 16, and disk 12 is keyed to and operates a suitably journaled shaft 11. Keyed to the shaft 11 are the sprocket wheels 10. Passing over the sprocket wheels 10 are endless chains 9 which also pass over the suitably mounted driven sprocket wheels 10'. As disk 12 revolves in a counter clockwise direction the upper run of the chains 9 is caused to travel from right to left in Fig. 1.

The endless chains 9 are provided at regular and predetermined intervals with inwardly projecting lugs 13, which engage the pullers 14 carried by base member 6'. The chains thus impart motion to the base 6' upon which rests the tray 6 containing the receptacles intended to be filled. The base is made separate from the tray for reasons of economy, inasmuch as several bases will serve for a large number of trays. The base is provided with dowel pins 62, which fit into holes 62' in the tray and thus insure the correct placing of the tray on the base and also prevent its displacement. This base 6' rests upon a track 7 and is equipped with the above mentioned pullers 14, which are engaged by the lugs 13. Track 7 is mounted on vertically adjustable supports 8 and the gage of the track is also adjustable by means of pillars (*a*) which are capable of being adjusted laterally in suitable slots with which the cross bars (*b*) are provided.

Secured to the under part of the base 6' is a toothed rack 61, the pitch of which corresponds with the longitudinal spacing of the rows of receptacles in the tray. The tray 6 may be made of any suitable material and is constructed so that the receptacles shall be disposed laterally in rows, with a distance between the centers that corresponds with the spacing of the nozzles 43, which deliver the liquid into the receptacles. It is obvious that a universal tray or trays having holes of different sizes may be used.

As the tray and base are caused to move from right to left along the track as described above, the first tooth of the track 61 is engaged by the detent 17 and its motion is arrested temporarily, the friction disk 12' thereupon slipping, while the receptacles in the tray are being filled as hereinafter described. The detent 17 is held in a sleeve 64, which is supported by an upright 66, and is held at the proper height by set screws 67. Detent 17 is normally held in a position to engage the teeth of the rack 61 by means of helical spring 65.

After the row of receptacles under the nozzles 43 has been filled, the detent 17 is disengaged from the corresponding tooth of the rack 61 by means of a trip 75, which projects through a longitudinal slot 75', and is engaged by a pin 18 mounted near the periphery of the wheel 19. This wheel 19 is keyed to the suitably journaled shaft 20, which is caused to revolve in the direction indicated by the arrow 25$^a$ by means of the sprocket 21, which is driven by means of the chain 22 and the sprocket 23, said sprocket 23 being keyed to the power shaft 24.

When the trip 75 is released from contact with the pin 18, the detent 17 is returned to its normal position by the helical spring 65, and is in position to engage the next succeeding tooth of the rack. This operation is repeated as many times as there are teeth in the rack and as the entire machine continues in operation.

The filling liquid is conveyed to the nozzles 43 for delivery to the receptacles by means of a pump 34, of the conventional plunger type, suitably mounted on the upright member 41 constituting a part of the frame 2. The pump 34 comprises a barrel 34$^a$, a stuffing box 33, a plunger 26, and check valves 35 and 36. The drain cocks 37 and 38 are provided for the removal of residual liquid. To the lower end of the pump is attached a suction tube 39, which is placed in the reservoir 40 which contains the filling liquid. Suction tube 39 is closed at the bottom and is provided with apertures 39' near its lower end.

Motive power is transmitted to the plunger 26 from the gear 5 by means of belt 25' and the connecting rod 27, which is attached to the plunger 26 by a knuckle joint 28. The connecting rod 27 is attached to the power wheel 25 in such a manner that when the wheel 25 revolves the reciprocating motion is imparted to the plunger. The reciprocating motion of the plunger, acting in conjunction with the check valves 35 and 36, forces the filling liquid from the reservoir 40 through the flexible connection 41' to the nozzles 43, and discharges the same intermittently therefrom into the receptacles. The volume of liquid discharged into the receptacles on the downward stroke of the plunger 26 is varied by altering the length of said stroke, the same being accomplished by the radial adjustment of the upper end of the connecting rod with respect to its driving wheel 25. This adjustment is accomplished through the agency of a T slot 30, bolt 29, and lock nut 29'. A calibrated scale 32 and index 31 permit the setting of the pump for the delivery into the receptacles of measured and predetermined volumes of the filling liquid. The multiple nozzle unit 42' which serves to distribute the filling liquid to the several receptacles is secured to the upright member 41 and is adjustable vertically, longitudinally, and laterally, by means of suitable clamps 46, 47, and 48, thus permitting of the centering of the nozzles 43 over the receptacles. The nozzle unit 42' comprises a common feed pipe 42, downwardly projecting outlets or nozzles 43, and the needle valves 44, the function of which is to permit of an initial adjustment to secure the delivery of an equal volume of liquid from each nozzle. This adjustment is of importance because of inaccuracy in machining, the nozzles are never identical and hence where refined measuring is required some means of compensating for this inaccuracy must be provided. Once set, these valves 44 are held in position by means of lock nuts 68.

In order to insure against the operation of the machine when no receptacles are in position to receive filling liquid, an automatic starting and stopping device 60' is provided. This device 60' is an automatic electrical switch, and is inserted in the motor circuit by means of wires W. It is supported by a vertically adjustable standard 60. The stopping device consists of a metallic cylinder 59, suitably chambered to accommodate the contact rod 51, the helical spring 57, and switch member 52. A flat bar, or shoe, 50, is secured to the upper end of the contact rod 51, the right hand end 50' (Fig. 3) of which is bent down at a suitable angle. This shoe 50 is retained in a position parallel to the direction of motion of the tray 6 by means of a key 58 which moves in a keyway in the cap 59' of the cylinder 59.

The rod 51 is normally held raised and out of contact with the switch member 52 by means of a helical spring 57, which lifts against a pin 69. The switch member 52 is directly connected with the post 53, the latter being insulated from the cylinder 59 by any suitable dielectric 56. It is thus evident that electrical connection is established between the binding posts 53 and 54 only when the rod 51 is depressed by the weight of the tray 6, and that upon removal of the depressing force the motor circuit will be broken and the machine will thereupon cease to operate. A short circuiting switch S is provided in order that the machine may, when desired, be operated when a tray is not in position, or in other words, when the contact rod 51 is not depressed.

The operation of the machine is as follows:

The reservoir 40 containing the filling liquid is placed in position with the plunger 26 at its lowest point, the lock nut 29' is loosened and the plunger 26 raised slightly and then forced down by hand until it strikes the cap 34' on the lower end of the barrel 34ª of the pump 34. In this manner the air present is displaced by the liquid. The index 31 is set at the proper scale division and power applied until the detent 17 has been tripped and is in position to engage the first tooth of the rack 61. During this operation the short circulating switch S is, of course, closed. Switch S is now opened and the tray 6 and base 6' are placed on the track 7 with the pullers 14 over a pair of the special links 13, and the first tooth of the rack 61 in contact with the detent 17. Such a condition is indicated in Fig. 3. The machine is now in operation and the following cycle occurs:

The plunger 26 makes its down stroke and the desired volume of liquid is delivered into the receptacles, the clutch 12 and 12' in the meantime slipping. The plunger then starts on its up or suction stroke and at the proper point the pin 18 actuates the trip 75, which releases the detent 17 from contact with the tooth of the rack 61. The clutch 12, 12' immediately becomes operative and the second transverse row of receptacles is brought into position under the nozzles 43, where the tray 6 is again detained, the detent 17 having been returned to its original position by virtue of the upward pressure of the spring 65. The plunger 26 then makes its down or delivery stroke, the second charge is expelled into the receptacles, and the cycle is repeated until all the receptacles in the tray have received their charges. The tray 6 passes off the shoe 50, the circuit is broken, and the machine is stopped.

It will be noted that if, as would usually be the case in practice, a second tray had been placed in position to be carried along by the next pair of pulling links, this tray would reach a position on the shoe 50, where its weight becomes effective in depressing the rod 51, before the first tray had passed on. In other words, as long as trays are fed to the machine the same will remain in operation, and will cease only when no receptacles are in position to receive their charges.

It has been previously mentioned that this machine operates under aseptic conditions, and it will be realized that this is of the utmost importance in the handling of certain liquids. In order to prevent any contamination from the operation of the plunger 26, I combine a disinfecting agent with the lubricant for the packing of said plunger.

The entire machine may be disinfected by merely applying a steam line to the suction tube 39 and operating the machine; or the same result may be accomplished by pumping boiling water through the machine.

Having fully described my invention, what I claim as new and desire to secure by Letters Patent is:

1. In a filling machine, the combination of means for moving the receptacles to be filled, said means consisting of a conveyer, and a tray carried thereby, means for engaging the tray and arresting the movement thereof, and means for discharging measured quantities of a liquid into said receptacles.

2. In a filling machine, the combination of means for moving the receptacles to be filled, said means consisting of a tray and a conveyer for moving the same, means for engaging and arresting said tray, said last named means including a spring pressed detent, and means for discharging accurately measured quantities of a liquid into said receptacles.

3. In a filling machine, the combination of means for carrying receptacles, said means consisting of a base member, pullers attached to said base member, a conveyer, said conveyer engaging said pullers and thereby moving said base member, means for intermittently engaging and stopping said base member, and means for discharging a liquid into the receptacles.

4. In a filling machine, the combination of means for carrying a receptacle, said means consisting of a base member, a rack thereon, a conveyer for moving said base member, a detent intermittently engaging said rack and thereby arresting the movement of said base member, and means for discharging a liquid into said receptacle.

5. In a filling machine, the combination of means for carrying a receptacle, said means consisting of a base member, a rack thereon, a conveyer for moving said base member, a detent for engaging said rack, means for disengaging said detent, and means for discharging measured quantities of a liquid.

6. In a filling machine, the combination of means for carrying a receptacle, said means consisting of a base member, a rack attached to the bottom thereof, means for moving said base member, means for engaging said rack, means for disengaging said engaging means, and means for measuring and discharging a liquid, all of said means being operated from a common source of power.

7. In a filling machine, the combination of a base member, a tray removably attached thereto, a rack on said base member, pullers attached to said base member, a conveyer engaging said pullers and moving said base member and tray, a detent intermittently engaging said rack and stopping said base member. a pump for discharging measured quantities of a liquid, all of said means operating in a cycle and from a common source of power.

8. In a filling machine, a receptacle carrying base, a conveyer for carrying said base, an electric motor for driving said conveyer, a vertically slidable shoe engaged and depressed by said base, thereby making an electric circuit to drive said motor.

9. In a filling machine, the combination of a conveyer for moving receptacles to be filled, means for arresting said movement, means for measuring a liquid, a plurality of means associated therewith for discharging the liquid, a motor operatively connected with both the conveyer and the measuring means, and means for rendering the machine operative when there is a load on the conveyer.

10. In a filling machine, the combination of an electric motor for operating the machine, a conveyer for moving receptacles to be filled, means for arresting said movement, means for discharging measured quantities of a liquid, and means for automatically rendering said machine inoperative when there is no load on said conveyer, and a short circuiting switch for operating said machine under such conditions.

11. In a bottle filling machine, a receptacle carrying base, a conveyer for moving said base, an electric motor for operating the conveyer, a vertically reciprocable shoe in the path of said base, a spring normally holding the shoe in an elevated position, and an electric switch adapted to be closed when the shoe is engaged and moved by said base, whereby the motor circuit is closed.

12. In a filling machine, a base member for carrying receptacles, a rack thereon, a conveyer for moving said base member, an electric motor for operating the conveyer, a detent for engaging said rack, means for disengaging said detent, means for discharging a measured quantity of a liquid, a reciprocable shoe in the path of said base member, and an electric switch adapted to be closed when the shoe is engaged and moved by said base member, whereby the motor circuit is closed.

13. In a filling machine, the combination of a base member for carrying receptacles, a rack thereon, a conveyer for moving said base member, an electric motor for operating the conveyer, a detent for engaging said rack, means for disengaging said detent, means for discharging variable measured quantities of a liquid, a reciprocable shoe in the path of said base member, an electric switch adapted to be closed when the shoe is engaged and moved by said base, whereby the motor circuit is closed, and a short circuiting switch whereby the machine may be operated when said first mentioned switch is open.

Signed this 8 day of March, 1920.

AUBREY V. FULLER.